United States Patent
Ramakrishnan et al.

(10) Patent No.: US 10,139,804 B2
(45) Date of Patent: Nov. 27, 2018

(54) SYSTEM AND METHOD FOR SELF-CALIBRATION OF AN ACTUATOR

(71) Applicant: Emerson Process Management Valve Automation, Inc., Houston, TX (US)

(72) Inventors: Thangaraja Ramakrishnan, Maharashtra (IN); Girish H. Dalbhanjan, Houston, TX (US); Paul Jay Schafbuch, Ames, IA (US)

(73) Assignee: Emerson Process Management Valve Automation, Inc., Houston, TX (US)

( * ) Notice: Subject to any disclaimer, the term of this patent is extended or adjusted under 35 U.S.C. 154(b) by 69 days.

(21) Appl. No.: 15/460,770

(22) Filed: Mar. 16, 2017

(65) Prior Publication Data
US 2017/0285607 A1    Oct. 5, 2017

(30) Foreign Application Priority Data
Mar. 29, 2016   (IN) .............................. 201621010857

(51) Int. Cl.
  *F16K 37/00*   (2006.01)
  *G05B 19/37*   (2006.01)
  *F16K 31/02*   (2006.01)
  *F15B 19/00*   (2006.01)

(52) U.S. Cl.
  CPC .......... *G05B 19/371* (2013.01); *F15B 19/002* (2013.01); *F16K 31/02* (2013.01); *F16K 37/005* (2013.01); *G05B 2219/39024* (2013.01)

(58) Field of Classification Search
  CPC ...... F16K 31/02; F16K 37/005; F15B 19/002; G05B 2219/39024; G05B 19/371
  See application file for complete search history.

(56) References Cited

U.S. PATENT DOCUMENTS

| | | | |
|---|---|---|---|
| 6,615,114 B1 | 9/2003 | Skiba et al. | |
| 6,671,641 B1 * | 12/2003 | Collins | F15B 19/002 324/73.1 |
| 8,170,761 B2 * | 5/2012 | Kraenzlein | F16K 37/0091 701/58 |
| 2008/0053191 A1 * | 3/2008 | Yoo | E02F 9/2221 73/1.72 |
| 2014/0163805 A1 | 6/2014 | Braunstein et al. | |

FOREIGN PATENT DOCUMENTS

| | | |
|---|---|---|
| EP | 0 591 925 A2 | 4/1994 |
| EP | 1 150 031 A1 | 10/2001 |
| WO | WO 2012094065 A1 * | 7/2012 ......... F16K 37/0075 |

OTHER PUBLICATIONS

Extended European Search Report for Application No. 17162107.1, dated Sep. 19, 2017.

* cited by examiner

*Primary Examiner* — Mischita Henson
(74) *Attorney, Agent, or Firm* — Marshall, Gerstein & Borun, LLP

(57) ABSTRACT

The present disclosure envisages a system and method for self-calibration of an actuator. The system comprises a pressure spike sensing and control circuit, a travel limit setting circuit and a profile generation circuit. The pressure spike sensing and control circuit is configured to check and set an operating pressure of the actuator. The travel limit setting circuit is configured to check and set the travel limit of the actuator. The profile generation circuit is configured to generate the profiles of a set of parameters of the actuator.

13 Claims, 5 Drawing Sheets

SYSTEM AND METHOD FOR SELF-CALIBRATION OF AN ACTUATOR

FIELD

The present disclosure relates to the field of electrical engineering.

BACKGROUND

Industrial control systems require actuation of certain mechanical components. Mechanical components of such systems may include valves that need to be actuated. Valves in mechanical systems that require precise control are actuated using quarter-turn actuators. A quarter turn actuator uses mechanical limit stop bolts which assist in precise end of stroke adjustment for open and closed valve positions. Typically, the stroke adjustment is done before installation and hence the amount of adjustment required for the actuator in a factory setting is not known. Further, quarter turn actuators for hydraulic valves rely on calibrated input control for precise operation. The input control of the quarter-turn actuator is generally done mechanically or electro-mechanically, such as an electro-hydraulic operated actuator. In such electro-hydraulic operators, deviations from the desired actuator travel cause consequent deviations in the valve positions and flow rate, owing to the constantly varying hydraulic pressures involved in the actuation of the valve. Conventionally, the stroke adjustment and calibration of the actuator is done manually and only before actual factory installation, which is inefficient. There is, therefore, felt a need for calibration of the electro-hydraulic actuators after installation and at other times in the life of the actuators.

OBJECTS

Some of the objects of the present disclosure, which at least one embodiment herein satisfies, are as follows.

It is an object of the present disclosure to ameliorate one or more problems of the prior art or at least provide a useful alternative.

An object of the present disclosure is to provide a system and a method for self-calibration of an actuator which is completely automated.

Another object of the present disclosure is to provide a system and a method for self-calibration of an actuator having a high accuracy of actuator calibration.

Yet another object of the present disclosure is to provide a system and a method for self-calibration of an actuator which can be used for all part-turn, linear hydraulic and pneumatic actuators.

Still another object of the present disclosure is to provide a system and a method for self-calibration of an actuator which can be used in any product that has an adjustable travel limit and requires the measurement of instantaneous parameters.

Other objects and advantages of the present disclosure will be more apparent from the following description, which is not intended to limit the scope of the present disclosure.

SUMMARY

The present disclosure envisages a system and method for self-calibration of an actuator. The system comprises a memory, a pressure spike sensing and control circuit, a travel limit setting circuit, a profile generation circuit and a processor. The memory configured to store a set of self-calibration rules. The pressure spike sensing and control circuit is configured to check and set an operating pressure of the actuator based on sensed spike in the operating pressure. The travel limit setting circuit is configured to check and set the travel limit of the actuator based on the set of self-calibration rules. The profile generation circuit is configured to generate the profiles of a set of parameters of the actuator. The processor cooperates with the memory, the pressure spike sensing and control circuit, the travel limit setting circuit and the profile generation circuit. The processor is configured to extract the set of self-calibration rules from the memory and instruct the pressure spike sensing and control circuit, the travel limit setting circuit and the profile generation circuit to perform self-calibration of the actuator based on the set of self-calibration rules.

In an embodiment, the pressure spike sensing and control circuit includes a first set of sensors, a first signal conditioning circuit, a detector and a pressure control circuit. The first set of sensors are disposed in the actuator. The first set of sensors are configured to sense the instantaneous value of the operating pressure of the actuator and generate a pressure signal. The first signal conditioning circuit is connected to the first set of sensors. The first signal conditioning circuit is configured to receive the pressure signal and generate a first conditioned signal. The detector is connected to the first signal conditioning circuit. The detector is configured to detect a spike in the first conditioned signal and generate a spike status signal at every instant of time. The pressure control circuit is connected to the detector. The pressure control circuit is configured to receive the spike status signal at a first instant time, increment the operating pressure by a first pre-determined value until a first spike is detected, and set the operating pressure to a second predetermined value if the first spike is detected. The pressure control circuit is further configured to receive the spike status signal at a second instant of time, increment the operating pressure by the first pre-determined value until a second spike is detected, set the operating pressure to a third predetermined value if the second spike is detected. The pressure control circuit is also configured to generate a first error signal if no spikes are detected.

In an embodiment, the travel limit setting circuit includes a second set of sensors, a second signal conditioning circuit, a digital signal processing circuit, and an error detection circuit. The second set of sensors are coupled to the actuator. The second set of sensors are configured to detect the rotation of the actuator and generate a set of rotation signals. The second signal conditioning circuit connected to the second set of sensors. The second signal conditioning circuit is configured to receive the set of rotational signal and generate a set of second conditioned signals. The digital signal processing circuit is connected to the second signal conditioning circuit. The digital signal processing circuit is configured to process the set of second conditioned signals and generate a set of travel limit signals. In an embodiment, the second set of sensors are configured to detect the rotation of the actuator for at least two rotational cycles of the actuator and generate the set of rotation signals associated with each of the at least two rotation cycles. In another embodiment, the second signal conditioning circuit is configured to generate the set of second conditioned signals for each of the set of rotation signals associated with each of the at least two rotation cycles. In yet another embodiment, the travel limit setting circuit includes an error detection circuit cooperating with the second signal conditioning circuit. The error detection circuit is configured to generate a set of difference signals by computing the differences between each pair of the set of second conditioned signals for each of the set of rotation signals associated with each of the at least two rotation cycles. The error detection circuit is further configured to generate a second error signal by comparing the set of difference signals, and re-initialize the actuation cycles of the actuator by checking the second error signal. In still another embodiment, the digital signal processing circuit includes an encoder and is cooperates with the second signal conditioning circuit and the error detection circuit. The digital signal processing circuit is configured to check the second error signal from the error detection circuit and compute the mean of the set of second conditioned signals associated with each of the at least two actuation cycles, when the second error signal is not received. The digital signal processing circuit is further configured to full-scale encode the mean of the set of second conditioned signal and generate the set of travel limit signals using the encoded mean of the set of second conditioned signals.

In an embodiment, the profile generation circuit includes a third set of sensors and a third signal conditioning circuit. The third set of sensors are coupled to the actuator. The third set of sensors are configured to detect the set of parameters of the actuator, to generate a set of profile signals. The third signal conditioning circuit is connected to the third set of sensors. The third signal conditioning circuit is configured to receive the set of profile signals to generate a set of third conditioned signals.

In an embodiment, the processor is configured to receive operating pressure from the pressure control circuit, convert the operating pressure to generate operating pressure data and store the operating pressure data in the memory. The processor is also configured to receive the set of travel limit signals from the digital signal processing circuit and store the set of travel limit signals in the repository. The processor is further configured to generate operating torque profile data using the operating pressure data and the set of travel limit signals and store the set of torque profile data in the memory. Furthermore, the processor is configured to receive the set of third conditioned signals, convert the set of third conditioned signals to generate a set of profile data, and store the set of profile data in the memory.

The present disclosure also envisages a method for self-calibration of an actuator. The method comprising the following steps:

initializing actuation cycles of the actuator;

detecting the instantaneous value of an operating pressure of the actuator and generating a pressure signal;

converting the pressure signal and generating a first conditioned signal;

detecting at least one spike in the first conditioned signal at a first instant of time;

incrementing the operating pressure by a first predetermined value until a first spike is detected;

setting the operating pressure to a second predetermined value if the first spike is detected;

detecting at least one spike in the first conditioned signal at a second instant of time;

incrementing the operating pressure by the first predetermined value until a second spike is detected;

setting the operating pressure to a third predetermined value if the second spike is detected;

generating a first error signal if no spikes are detected;

converting the operating pressure to generate operating pressure data;

storing the operating pressure data in the memory;

re-initializing the actuation cycles of the actuator;

detecting rotation of the actuator during the actuation cycles and generating a set of rotation signals;

generating a set of second conditioned signals using the set of rotation signals;

generating a set of travel limit signals using the set of second conditioned signals;

storing the set of travel limit signals;

generating operating torque profile data using the operating pressure data and the set of travel limit signals, storing the set of torque profile data in the memory, detecting a set of parameters of the actuator and generating a set of profile signals;

generating a set of third conditioned signals using the set of profile signals;

converting the set of third conditioned signals and generating a set of profile data; and storing the set of profile data.

BRIEF DESCRIPTION OF THE ACCOMPANYING DRAWING

The system and method for self-calibration of an actuator, of the present disclosure, will now be described with the help of the non-limiting accompanying drawing, in which.

DETAILED DESCRIPTION

The disclosure will now be described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Figure 1:
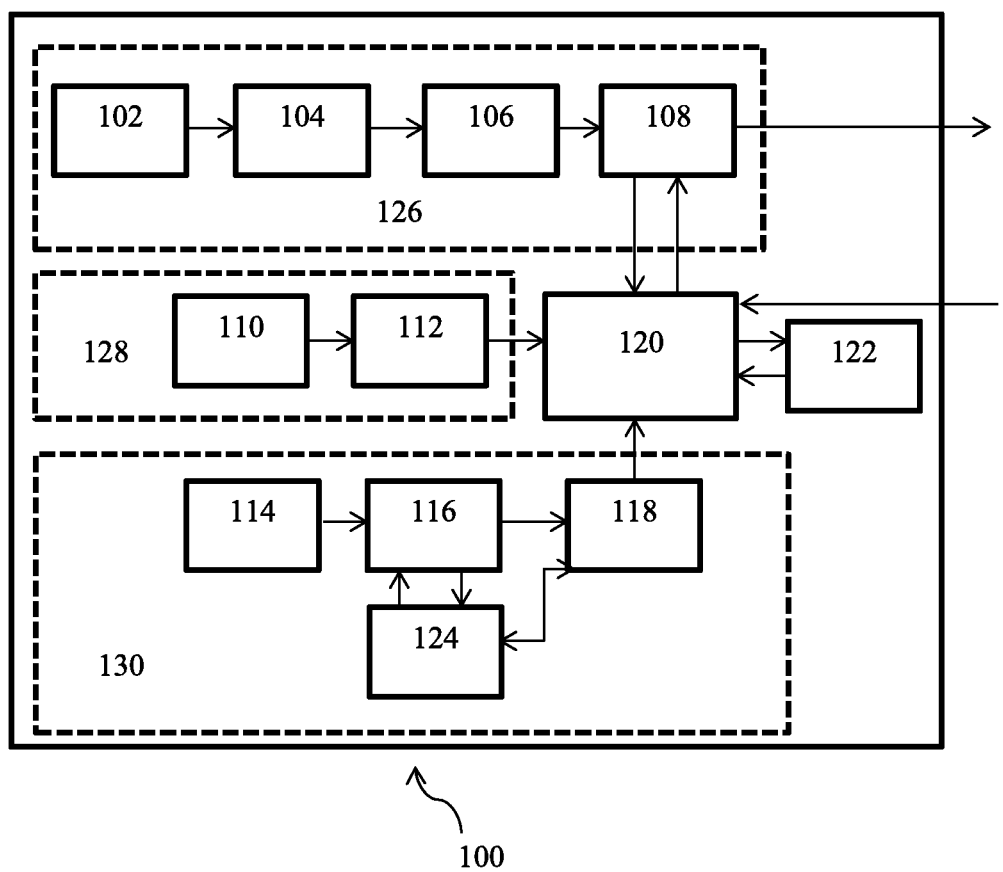
FIG. 1 illustrates a block diagram of a system for self-calibration of an actuator, in accordance with an embodiment of the present disclosure.

FIG. 1 illustrates a block diagram of a system for self-calibration of an actuator, in accordance with an embodiment of the present disclosure. The system 100 includes a memory 122, a pressure spike sensing and control circuit 126, a profile generation circuit 128, a travel limit setting circuit 130 and a processor 120.

The memory 122 is configured to store a set of self-calibration rules. The pressure spike sensing and control circuit 126 is configured to check and set an operating pressure of the actuator based on sensed spike in the operating pressure. The travel limit setting circuit 130 is configured to check and set the travel limit of the actuator based on the set of self-calibration rules. The profile generation circuit 128 is configured to generate the profiles of a set of parameters of the actuator. The processor 120 cooperates with the memory 122, the pressure spike sensing and control circuit 126, the travel limit setting circuit 130 and the profile generation circuit 128. The processor 120 is configured to extract the set of self-calibration rules from the memory 122 and instruct the pressure spike sensing and control circuit 126, the travel limit setting circuit 130 and the profile generation circuit 128 to perform self-calibration of the actuator based on the set of self-calibration rules.

The pressure spike sensing and control circuit 126 includes a first set of sensors 102, a first signal conditioning circuit 104, a detector 106, and a pressure control circuit 108. The first set of sensors 102 is disposed in the actuator. The first set of sensors 102 are selected from the group consisting of pressure sensors, force collector type sensors, capacitive sensors, electromagnetic sensors, potentiometric sensors and MEMS sensors. The first set of sensors 102 is configured to sense an operating pressure of the actuator and generate a pressure signal.

The first signal conditioning circuit 104 is connected to the connected to the first set of sensors 102. The first signal conditioning circuit 104 may include an operational amplifier (not shown in figure), a plurality of resistors (not shown in figure), a plurality of transistors (not shown in figure) and capacitors (not shown in figure). The first signal conditioning circuit 104 is configured to receive the pressure signal and generate a first conditioned signal.

The detector 106 is connected to the first signal conditioning circuit 104. The detector 106 may include an operation amplifier in a negative feedback configuration, a diode connected at an output of the operation amplifier, a capacitor and a switch connected at a negative input terminal of the operational amplifier. The detector 106 is configured to detect a spike in the first conditioned signal and generate a spike status signal at every instant of time.

The pressure control circuit 108 is connected to detector 106 and the processor 120. The pressure control circuit 108 may include a coprocessor and digital counters. The pressure control circuit 108 is configured to:
receive the spike status signal at a first instant time,
increment the operating pressure by a first pre-determined value until a first spike is detected,
set the operating pressure to a second predetermined value if the first spike is detected,
receive the spike status signal at a second instant of time,
increment the operating pressure by the first pre-determined value until a second spike is detected,
set the operating pressure to a third predetermined value if the second spike is detected, and
generate a first error signal if no spikes are detected.

In an exemplary embodiment the first pre-determined value is 50 psi, the second predetermined value is 2000 psi and the third predetermined value is 3000 psi.

The travel limit setting circuit 130 includes a second set of sensors 114, a second signal conditioning circuit 116, a digital signal processing circuit 118 and an error detection circuit 124.

The second set of sensors 114 are coupled to the actuator. The second set of sensors 114 are coupled to the actuator. The second set of sensors may include Hall Effect sensors. The second set of sensors is configured to detect the rotation of the actuator and generate a set of rotation signals. The second set of sensors 114 are further configured to detect the rotation of the actuator for at least two rotational cycles of the actuator and generate the set of rotation signals associated with each of the at least two rotation cycles.

The second signal conditioning circuit 116 is connected to the second set of sensors 114. The second signal conditioning circuit 116 is configured to receive the set of rotational signals and generate a set of second conditioned signals. The second signal conditioning circuit 116 may include an offset cancellation circuit, a signal amplifier, low pass filter, a control unit and a current limiter. The second signal conditioning circuit 116 is further configured to generate the set of second conditioned signals for each of the set of rotation signals associated with each of the at least two rotation cycles.

The error detection circuit 124 is connected to the second signal conditioning circuit 116. The error detection circuit 124 may include an operational amplifier in an open loop configuration, transistors and resistors. The error detection circuit 124 is configured to:
generate a set of difference signals by computing the differences between each pair of the set of second conditioned signals for each of the set of rotation signals associated with each of the at least two rotation cycles,
generate a second error signal by comparing the set of difference signals, and
re-initialize the actuation cycles of the actuator by checking the second error signal.

The digital signal processing circuit 118 is connected to the second signal conditioning circuit 116 and the error detection circuit 124. The digital signal processing circuit 118 is configured to process the set of second conditioned signals and generate a set of travel limit signals. The digital signal processing circuit 118 may include a digital signal processor and an encoder. The digital signal processing circuit is further configured to:
check the second error signal from the error detection circuit,
compute the mean of the set of second conditioned signals associated with each of the at least two actuation cycles, when the second error signal is not received,
full-scale encode the mean of the set of second conditioned signal, and
generate the set of travel limit signals using the encoded mean of the set of second conditioned signals.

The profile generation circuit 128 includes a third set of sensors 110 and a third signal conditioning circuit 112.

The third set of sensors 110 are coupled to the actuator. The third set of sensors 110 is configured to detect the set of parameters of the actuator and generate a set of profile signals. In an embodiment, the third set of sensors 110 are configured to generate pressure profile signals, torque profile signals, time profile signals and rotation profile signals of various mechanical parts of the actuator.

The third signal conditioning circuit 112 is connected to the third set of sensors. The third signal conditioning circuit 112 is configured to receive the set of profile signals and generate a set of third conditioned signals.

The processor 120 is selected from the group consisting of an application specific integrated circuit, a microprocessor, a microcontroller, an embedded processor, an ARM processor and a FPGA. The processor 120 is configured to generate sync and control signals and transmit the sync and control signals to the pressure spike sensing and control circuit 126, the profile generation circuit 128, the travel limit setting circuit 130 and the memory 122, to control and synchronize the operation of circuits and modules. The processor 120 is further configured to:

receive operating pressure from the pressure control circuit, convert the operating pressure to generate operating pressure data, store the operating pressure data in the memory, receive the set of travel limit signals from the digital signal processing circuit, store the set of travel limit signals in the memory, generate operating torque profile data using the operating pressure data and the set of travel limit signals, store the set of torque profile data in the memory, receive the set of third conditioned signals, convert the set of third conditioned signals to generate a set of profile data, and store the set of profile data in the memory.

Figure 2:
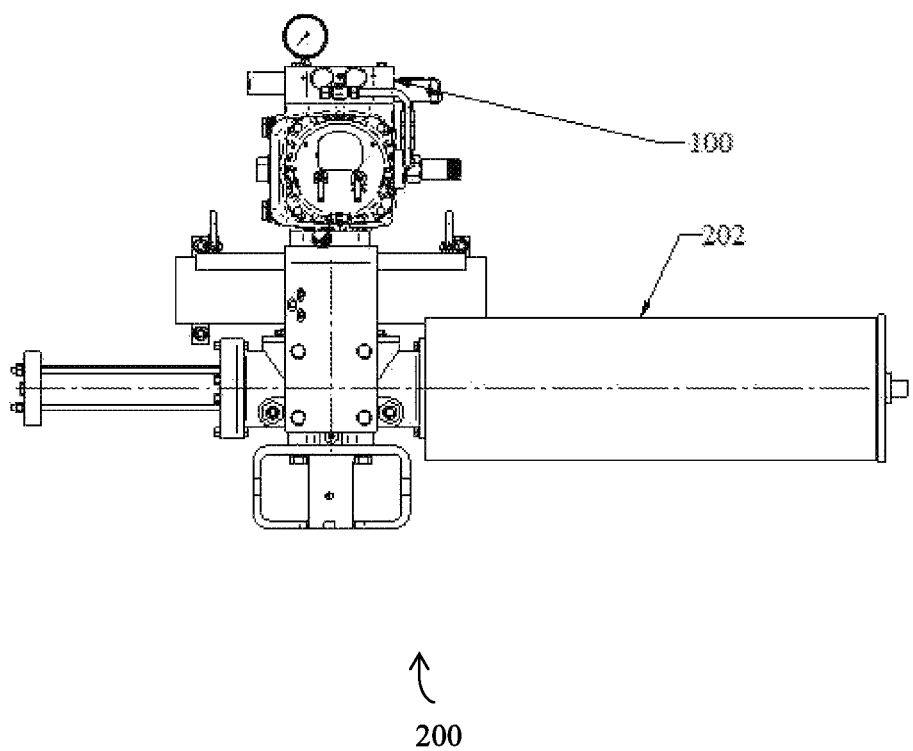
FIG. 2 illustrates a schematic view of an actuator and the system of FIG. 1, in accordance with an embodiment of the present disclosure.

FIG. 2 illustrates a schematic view 200 of the actuator 202 and the system 100 of FIG. 1, in accordance with an embodiment of the present disclosure. The actuator 202 may be a hydraulic actuator.

Figure 3A:
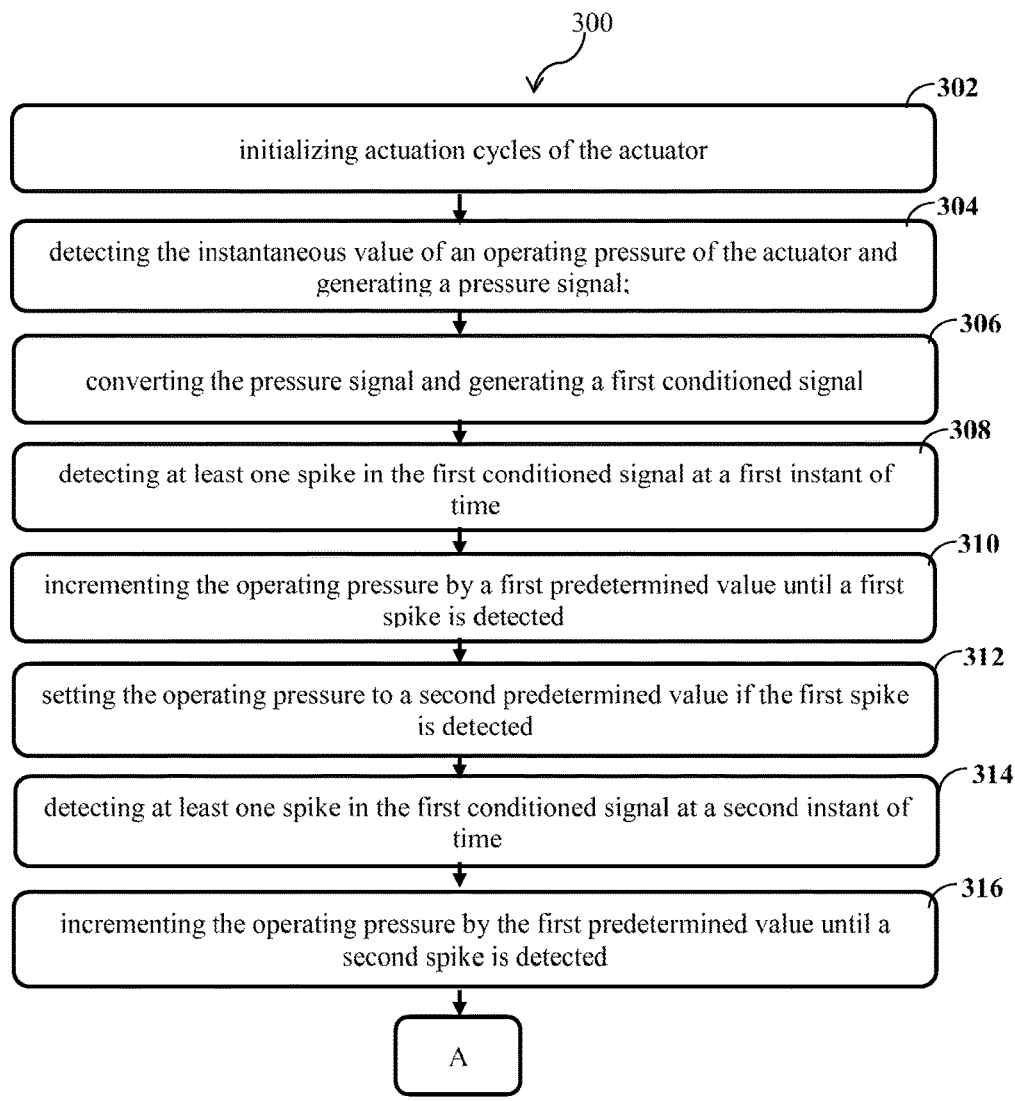
FIGS. 3A to 3C illustrate a block diagram depicting a method for self-calibration of an actuator, in accordance with an embodiment of the present disclosure.
Figure 3B:
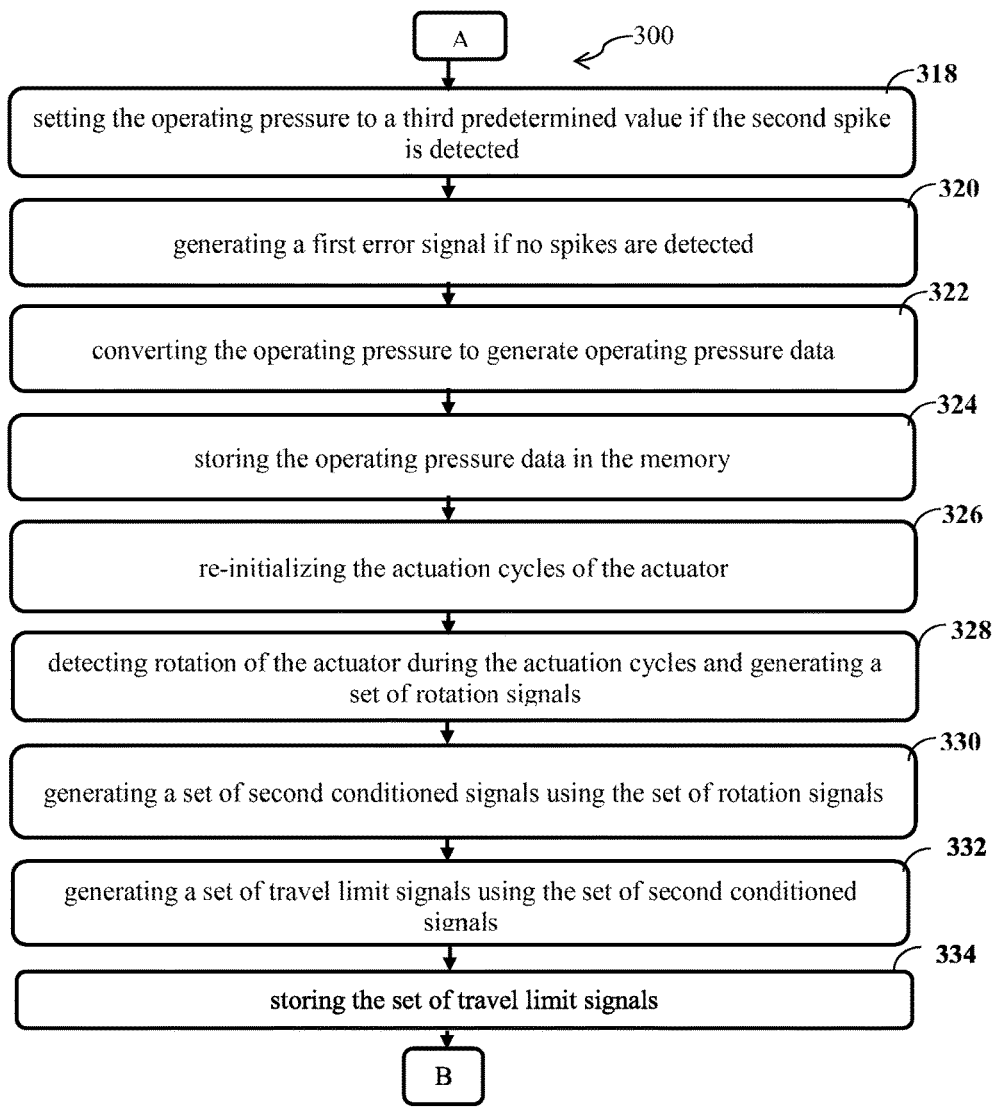
Figure 3C:
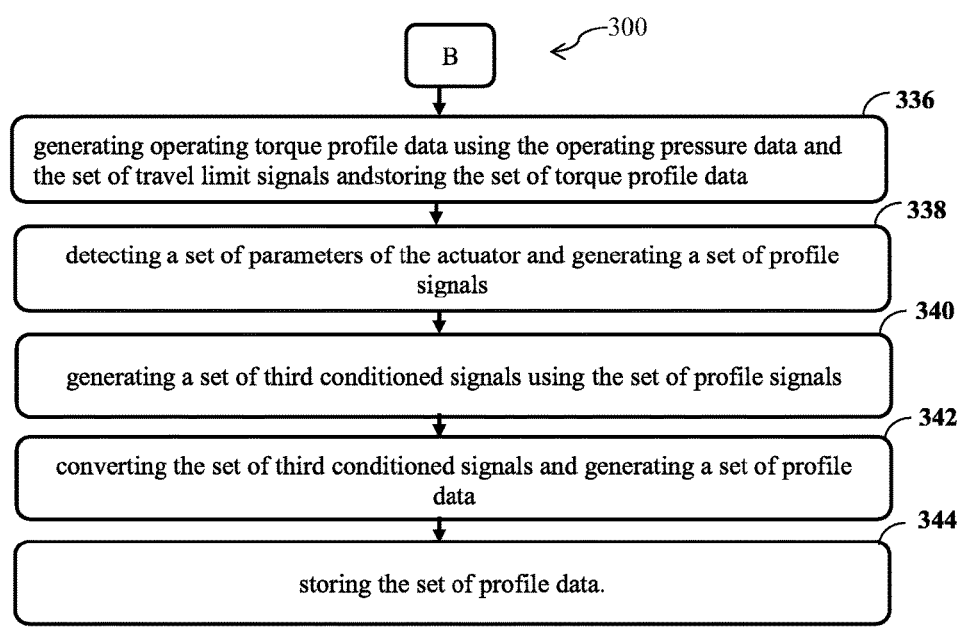

FIG. 3 illustrates a method for self-calibration of an actuator. Generally, computer executable instructions may include routines, programs, objects, components and modules. The method 300 may be implemented in any suitable hardware, software, firmware, or combination thereof.

At block 302, the method 300 includes initializing actuation cycles of the actuator. In an embodiment, the processor 120 is configured to initialize actuation cycles of the actuator.

At block 304, the method 300 includes detecting an instantaneous pressure of the actuator and generating a first pressure signal. In an embodiment, the first set of sensors 102 is configured to sense an operating pressure of the actuator and generate a pressure signal.

At block 306, the method 300 includes converting the pressure signal and generating a first conditioned signal. In an embodiment, the first signal conditioning circuit 104 is configured to receive the pressure signal to generate a first conditioned signal.

At block 308, the method 300 includes detecting at least one spike in the first conditioned signal at a first instant of time. In an embodiment, the detector 106 is configured to detect a spike in the first conditioned signal and generate a spike status signal at every instant of time.

At block 310, the method 300 includes incrementing the operating pressure by a first predetermined value until a first spike is detected. In an embodiment, the pressure control circuit 108 is configured to increment the operating pressure of the actuator by a first pre-determined value until a spike is detected.

At block 312, the method 300 includes setting the operating pressure to a second predetermined value if the first spike is detected. In an embodiment, the pressure control circuit 108 is configured to set the operating pressure to a second predetermined value if the spike is detected.

At block 314, the method 300 includes detecting at least one spike in the first conditioned signal at a second instant of time. In an embodiment, the detector 106 is configured to detect at least one spike in the first conditioned signal at a second instant of time.

At block 316, the method 300 includes incrementing the operating pressure by the first predetermined value until a second spike is detected. In an embodiment, the pressure control circuit 106 is configured to increment the operating pressure by the first predetermined value until a second spike is detected.

At block 318, the method 300 includes setting the operating pressure to a third predetermined value if the second spike is detected. In an embodiment, the pressure control circuit 106 is configured to set the operating pressure to a third predetermined value if the second spike is detected.

At block 320, the method 300 includes generating a first error signal if no spikes are detected. In an embodiment, the pressure control circuit 108 is configured to generate a first error signal if no spikes are detected.

At block 322, the method 300 includes converting the operating pressure to generate operating pressure data. In an embodiment, the processor 120 is configured to convert the operating pressure to generate operating pressure data.

At block 324, the method 300 includes storing the operating pressure data in the memory. In an embodiment, the processor 120 is configured to store the operating pressure data in the memory.

At block 326, the method 300 includes re-initializing the actuation cycles of the actuator. In an embodiment, the processor 120 is configured to re-initialize the actuation cycles of the actuator.

At block 328, the method 300 includes detecting rotation of the actuator during the actuation cycles and generating a set of rotation signals. In an embodiment, the second set of sensors 114 is configured to detect rotation of the actuator during the actuation cycles and generate a set of rotation signals.

At block 330, the method 300 includes generating a set of second conditioned signals using the set of rotation signals. In an embodiment, the second signal conditioning circuit 116 is configured to generate a set of second conditioned signals using the set of rotation signals.

At block 332, the method 300 includes generating a set of travel limit signals using the set of second conditioned signals. In an embodiment, the digital signal processing circuit 118 is configured to generate a set of travel limit signals using the set of second conditioned signals.

At block 334, the method 300 includes storing the set of travel limit signals. In an embodiment, the processor 120 is configured to store the set of travel limit signals.

At block 336, the method 300 includes generating operating torque profile data using the operating pressure data and the set of travel limit signals, and storing the set of torque profile data in the memory. In an embodiment, the processor 120 is configured to generate operating torque profile data using the operating pressure data and the set of travel limit signals and store the set of torque profile data.

At block 338, the method 300 includes detecting a set of parameters of the actuator and generating a set of profile signals. In an embodiment, the third set of sensors 110 is configured to detect a set of parameters of the actuator and generate a set of profile signals.

At block 340, the method 300 includes generating a set of third conditioned signals using the set of profile signals. In an embodiment, the third signal conditioning circuit 112 is configured to generate a set of third conditioned signals using the set of profile signals.

At block 342, the method 300 includes converting the set of third conditioned signals and generating a set of profile data. In an embodiment, the processor 120 is configured to convert the set of third conditioned signals and generating a set of profile data.

At block 344, the method 300 includes storing the set of profile data. In an embodiment, the processor 120 is configured to store the set of profile data in the memory.

In an embodiment, a step at block 328 is repeated for at least two actuation cycles thereby generating a set of rotation signals for each of the rotation cycles and is further succeeded by the step of generating the set of second conditioned signals for each of the set of rotation signals associated with each of the at least two rotation cycles.

In an embodiment, the step of generating the set of second conditioned signals for each of the set of rotation signals associated with each of the at least two rotation cycles is succeeded by the steps of:

generating a set of difference signals by computing the differences between each pair of the set of second conditioned signals for each of the set of rotation signals associated with each of the at least two rotation cycles, and generating a second error signal by comparing the set of difference signals.

In an embodiment, the step of generating a second error signal is succeeded by the following steps:

checking the second error signal, computing the mean of the set of second conditioned signals associated with each of the at least two actuation cycles, when the second error signal is not received, full-scale encoding the mean of the set of second conditioned signal, and generating the set of travel limit signals using the encoded mean of the set of second conditioned signals.

Technical Advances and Economical Significance

The present disclosure described hereinabove has several technical advantages including but not limited to the realization of a system and a method for self-calibration of an actuator that:

is automated and hence provides ease of calibration, calibrates all parameters of the actuator, generates profiles of all parameters of the actuator, and stores calibrated values and profiles of all the parameters for future calibration.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A system for self-calibration of an actuator comprising:

a memory configured to store a set of self-calibration rules;

a pressure spike sensing and control circuit configured to check and set an operating pressure of said actuator based on sensed spike in said operating pressure;

a travel limit setting circuit configured to check and set the travel limit of said actuator based on said set of self-calibration rules;

a profile generation circuit configured to generate the profiles of a set of parameters of said actuator; and a processor cooperating with said memory, said pressure spike sensing and control circuit, said travel limit setting circuit and said profile generation circuit, and configured to extract said set of self-calibration rules from said memory and instruct said pressure spike sensing and control circuit, said travel limit setting circuit and said profile generation circuit to perform self-calibration of said actuator based on said set of self-calibration rules.

2. The system as claimed in claim 1, wherein said pressure spike sensing and control circuit includes:

a first set of sensors disposed in said actuator, said first set of sensors configured to sense the instantaneous value of said operating pressure of said actuator and generate a pressure signal;

a first signal conditioning circuit connected to said first set of sensors, said first signal conditioning circuit configured to receive said pressure signal to generate a first conditioned signal; and a detector connected to said first signal conditioning circuit, said detector configured to detect a spike in said first conditioned signal and generate a spike status signal at every instant of time;

a pressure control circuit connected to said detector, said pressure control circuit configured to:

receive said spike status signal at a first instant time, increment said operating pressure by a first pre-determined value until a first spike is detected, set said operating pressure to a second predetermined value if said first spike is detected, receive said spike status signal at a second instant of time, increment said operating pressure by said first pre-determined value until a second spike is detected, and set said operating pressure to a third predetermined value if said second spike is detected; and generate a first error signal if no spikes are detected.

3. The system as claimed in claim 2, wherein said travel limit setting circuit includes:

a second set of sensors coupled to said actuator, said second set of sensors configured to detect the rotation of said actuator, to generate a set of rotation signals;

a second signal conditioning circuit connected to said second set of sensors, said second signal conditioning circuit configured to receive said set of rotational signal to generate a set of second conditioned signals; and a digital signal processing circuit connected to said second signal conditioning circuit, said digital signal processing circuit configured to process said set of second conditioned signals and generate a set of travel limit signals.

4. The system as claimed in claim 3, wherein said profile generation circuit includes:

a third set of sensors coupled to said actuator, said third set of sensors configured to detect said set of parameters of said actuator, to generate a set of profile signals; and a third signal conditioning circuit connected to said third set of sensors, said third signal conditioning circuit configured to receive said set of profile signals to generate a set of third conditioned signals.

5. The system as claimed in claim 4, wherein said processor is configured to:

receive operating pressure from said pressure control circuit, convert said operating pressure to generate operating pressure data, store said operating pressure data in said memory, receive said set of travel limit signals from said digital signal processing circuit, store said set of travel limit signals in said memory, generate operating torque profile data using said operating pressure data and said set of travel limit signals, store said set of torque profile data in said memory, receive said set of third conditioned signals, convert said set of third conditioned signals to generate a set of profile data, and store said set of profile data in said memory.

6. The system as claimed in claim 3, wherein said second set of sensors are configured to detect the rotation of said actuator for at least two rotational cycles of said actuator and generate said set of rotation signals associated with each of said at least two rotation cycles, and said second signal conditioning circuit is configured to generate said set of second conditioned signals for each of said set of rotation signals associated with each of said at least two rotation cycles.

7. The system as claimed in claim 6, wherein said travel limit setting circuit includes an error detection circuit, said error detection circuit cooperating with said second signal conditioning circuit and configured to:

generate a set of difference signals by computing the differences between each pair of said set of second conditioned signals for each of said set of rotation signals associated with each of said at least two rotation cycles, generate a second error signal by comparing said set of difference signals, and re-initialize said actuation cycles of said actuator by checking said second error signal.

8. The system as claimed in claim 7, wherein said digital signal processing circuit includes an encoder and cooperates with said second signal conditioning circuit, and said error detection circuit, said digital signal processing circuit configured to:

check said second error signal from said error detection circuit, compute the mean of said set of second conditioned signals associated with each of said at least two actuation cycles, when said second error signal is not received, full-scale encode the mean of said set of second conditioned signal, and generate said set of travel limit signals using the encoded mean of said set of second conditioned signals.

9. The system as claimed in claim 8, wherein at least sensor from said second set of sensors is a Hall-effect sensor.

10. A method for self-calibration of an actuator, said method comprises following sequential steps:

initializing actuation cycles of said actuator;

detecting the instantaneous value of an operating pressure of said actuator and generating a pressure signal;

converting said pressure signal and generating a first conditioned signal;

detecting at least one spike in said first conditioned signal at a first instant of time;

incrementing said operating pressure by a first predetermined value until a first spike is detected;

setting said operating pressure to a second predetermined value if said first spike is detected;

detecting at least one spike in said first conditioned signal at a second instant of time;

incrementing said operating pressure by said first predetermined value until a second spike is detected;

setting said operating pressure to a third predetermined value if said second spike is detected;

generating a first error signal if no spikes are detected;

converting said operating pressure to generate operating pressure data;

storing said operating pressure data in said memory;

re-initializing said actuation cycles of said actuator;

detecting rotation of said actuator during said actuation cycles and generating a set of rotation signals;

generating a set of second conditioned signals using said set of rotation signals;

generating a set of travel limit signals using said set of second conditioned signals;

storing said set of travel limit signals;

generating operating torque profile data using said operating pressure data and said set of travel limit signals, storing said set of torque profile data in said memory, detecting a set of parameters of said actuator and generating a set of profile signals;

generating a set of third conditioned signals using said set of profile signals;

converting said set of third conditioned signals and generating a set of profile data; and storing said set of profile data.

11. The method as claimed in claim 10, wherein said step of detecting the rotation of said actuator is repeated for at least two actuation cycles thereby generating a set of rotation signals for each of said rotation cycles and is further succeeded by the step of generating said set of second conditioned signals for each of said set of rotation signals associated with each of said at least two rotation cycles.

12. The method as claimed in claim 11, wherein said step of generating said set of second conditioned signals for each of said set of rotation signals associated with each of said at least two rotation cycles is succeeded by the steps of:

generating a set of difference signals by computing the differences between each pair of said set of second conditioned signals for each of said set of rotation signals associated with each of said at least two rotation cycles, and generating a second error signal by comparing said set of difference signals.

13. The method as claimed in claim 12, wherein said step of generating a second error signal is succeeded by the following steps:

checking said second error signal, computing the mean of said set of second conditioned signals associated with each of said at least two actuation cycles, when said second error signal is not received, full-scale encoding the mean of said set of second conditioned signal, and generating said set of travel limit signals using the encoded mean of said set of second conditioned signals.

* * * * *